(12) United States Patent
Gorski et al.

(10) Patent No.: US 10,893,029 B1
(45) Date of Patent: Jan. 12, 2021

(54) SECURE COMPUTING SERVICE ENVIRONMENT

(71) Applicant: Amazon Technologies, Inc., Seattle, WA (US)

(72) Inventors: Christopher Albert Gorski, Gettysburg, PA (US); Carl Jay Moses, Nokesville, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/848,152

(22) Filed: Sep. 8, 2015

(51) Int. Cl.
*H04L 29/06* (2006.01)
*G06F 12/14* (2006.01)
*G06F 21/60* (2013.01)
*G06F 21/62* (2013.01)

(52) U.S. Cl.
CPC ...... *H04L 63/0471* (2013.01); *G06F 12/1408* (2013.01); *G06F 21/602* (2013.01); *G06F 21/6218* (2013.01); *G06F 2212/1052* (2013.01)

(58) Field of Classification Search
CPC .................. H04L 63/0471; G06F 21/6218
See application file for complete search history.

(56) References Cited

U.S. PATENT DOCUMENTS

| | | | | |
|---|---|---|---|---|
| 8,201,237 B1 * | 6/2012 | Doane | ............... | H04L 63/0272 726/15 |
| 8,230,050 B1 * | 7/2012 | Brandwine | ........... | H04L 45/586 709/220 |
| 9,137,209 B1 * | 9/2015 | Brandwine | ......... | H04L 63/0272 |
| 9,225,529 B1 * | 12/2015 | Natanzon | ............... | H04L 67/10 |
| 2006/0117161 A1 * | 6/2006 | Venturi | ................... | G06F 3/061 711/171 |
| 2007/0088702 A1 * | 4/2007 | Fridella | ............. | H04L 29/12169 |

(Continued)

FOREIGN PATENT DOCUMENTS

WO   WO 2012057942 A1 *  5/2012  ......... G06F 21/6218

OTHER PUBLICATIONS

Menezes, Alfred J.; van Oorschot, Paul C.; Vanstone, Scott A.; "Handbook of Applied Cryptography", Chapter 1, CRC Press LLC, 1997, 48 pages.*

(Continued)

*Primary Examiner* — Victor Lesniewski
(74) *Attorney, Agent, or Firm* — Thorpe North & Western, LLP.

(57) ABSTRACT

A technology is described for a virtual secure region. An example method may include receiving a request for data stored in a secure computing service environment executing on computing resources used to provide a public computing service environment, where the secure computing service environment may be separated from the public computing environment using encryption. In response to the request, a secure region account that corresponds to a public region account may be identified using a translation table that maps the secure region account to the public region account. A storage location for the data may be identified within the secure computing service environment specified by the secure region account, and the data may be obtained from the storage location within the secure computing service environment. The data may then be transferred to the public computing service environment.

20 Claims, 7 Drawing Sheets

(56) References Cited

U.S. PATENT DOCUMENTS

| | | | | |
|---|---|---|---|---|
| 2007/0136391 A1* | 6/2007 | Anzai | G06F 17/30197 | |
| 2008/0243962 A1* | 10/2008 | Mimatsu | G06F 17/302 | |
| 2009/0205049 A1* | 8/2009 | Chakra | G06F 21/6218 | 726/26 |
| 2011/0119464 A1* | 5/2011 | Karr | G06F 3/0613 | 711/171 |
| 2012/0233668 A1* | 9/2012 | Leafe | G06F 9/44526 | 726/4 |
| 2013/0219176 A1* | 8/2013 | Akella | G06F 16/185 | 713/165 |
| 2013/0227699 A1* | 8/2013 | Barak | H04L 63/10 | 726/26 |
| 2013/0282776 A1* | 10/2013 | Durrant | G06F 17/30115 | 707/827 |
| 2014/0033200 A1* | 1/2014 | Tompkins | H04L 63/061 | 718/1 |
| 2014/0189203 A1* | 7/2014 | Suzuki | G06F 12/0246 | 711/103 |
| 2014/0245296 A1* | 8/2014 | Sethuramalingam | G06F 8/65 | 718/1 |
| 2014/0258716 A1* | 9/2014 | MacMillan | G06F 21/53 | 713/164 |
| 2015/0143134 A1* | 5/2015 | Hashimoto | G06F 21/6209 | 713/193 |
| 2015/0160961 A1* | 6/2015 | Johnson | G06F 9/45558 | 718/1 |
| 2015/0222606 A1* | 8/2015 | Yan | H04L 9/0847 | 713/171 |
| 2015/0317088 A1* | 11/2015 | Hussain | G06F 9/50 | 711/103 |
| 2015/0381425 A1* | 12/2015 | Kansal | H04L 41/0896 | 709/224 |
| 2016/0004642 A1* | 1/2016 | Sugimoto | G06F 3/06 | 711/128 |
| 2016/0078245 A1* | 3/2016 | Amarendran | H04L 67/10 | 713/193 |
| 2016/0149877 A1* | 5/2016 | Kancharla | H04L 9/3234 | 713/171 |
| 2016/0162316 A1* | 6/2016 | King | G06F 13/28 | 718/1 |
| 2016/0203027 A1* | 7/2016 | Challa | G06F 9/45558 | 718/1 |
| 2016/0246635 A1* | 8/2016 | Kaplan | G06F 9/50 | |
| 2016/0292442 A1* | 10/2016 | Axnix | G06F 12/1408 | |
| 2017/0060918 A1* | 3/2017 | Iyer | G06F 16/185 | |

OTHER PUBLICATIONS

Caliskan, Murat; Ozsiginan, Mustafa; Kugu, Emin; "Benefits of the Virtualization Technologies with Intrusion Detection and Prevention Systems", 7th International Conference on Application of Information and Communication Technologies, IEEE, Oct. 23-25, 2013, 5 pages.*

Ding, Baozeng; He, Yeping; Wu, Yanjun; Lin, Yuqi; "HyperVerify: A VM-assisted Architecture for Monitoring Hypervisor Non-control Data", Seventh International Conference on Software Security and Reliability Companion, IEEE, Jun. 18-20, 2013, pp. 26-35.*

* cited by examiner

SECURE COMPUTING SERVICE ENVIRONMENT

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

A specialized data center may be designed to allow government agencies, contractors, educational institutions and other government entities to execute sensitive workloads within a virtualized computing environment by addressing specific regulatory and compliance requirements that restrict physical and virtual access to the data center. For example, computing hardware, software, and data located in the specialized data center may be accessible to authorized government personnel only. As such, the data center may be a physically separate secure restricted data center that complies with particular government regulations.

DETAILED DESCRIPTION

Figure 1:
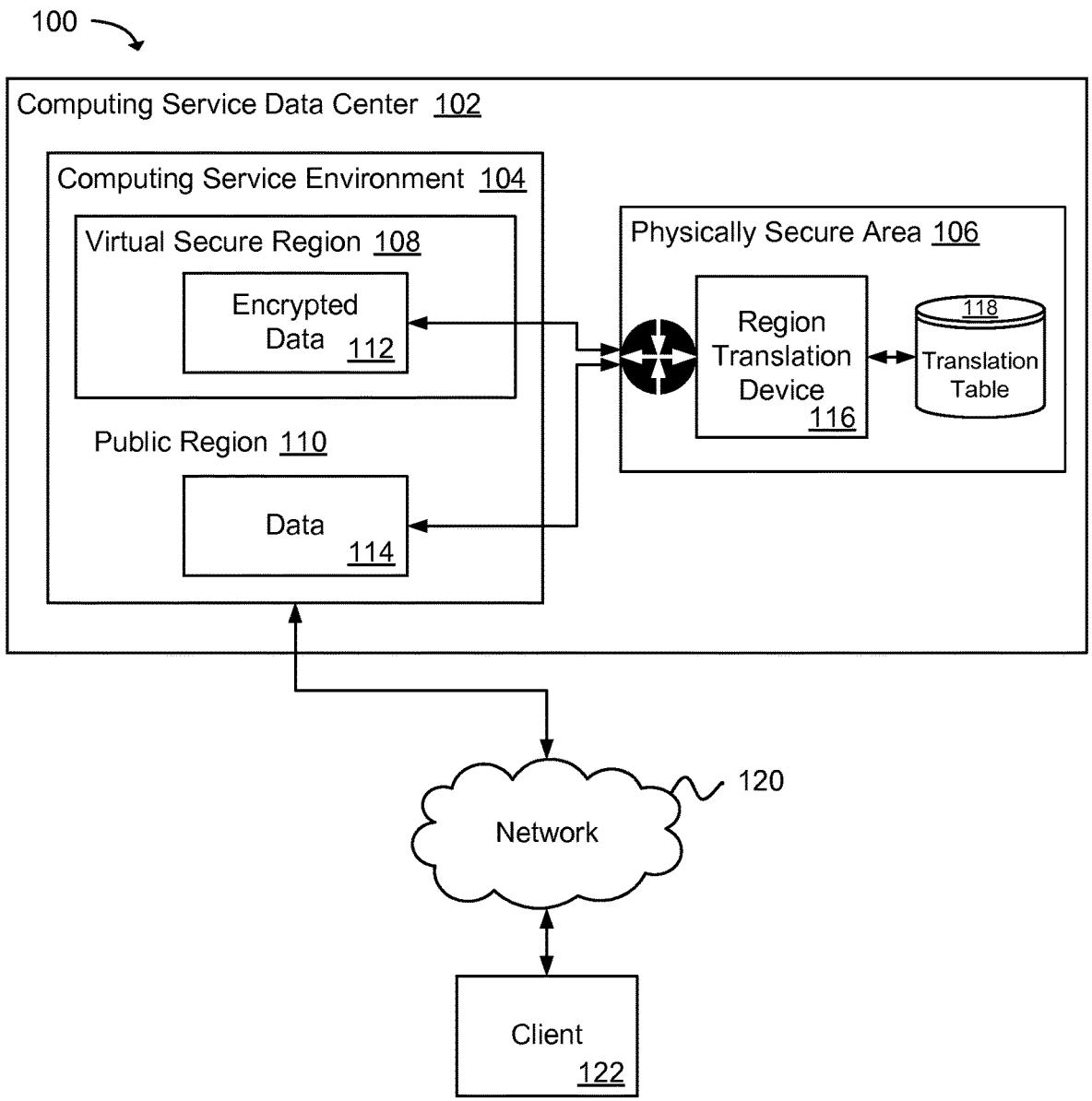
FIG. 1 is a block diagram illustrating an example system for a virtual secure region that exists within a public region of a computing service environment.

A technology is described for a virtual secure region that may be logically separated from a public region within a computing service environment. In addition, the virtual secure region may have some physical separation from a public region (e.g., located in the same data center as the public region but located in a locked room). The virtual secure region may be implemented within a computing service environment by obfuscating a relationship between secure region accounts and public accounts and using encryption to encrypt secure data that may be stored in the virtual secure region contained within the public region of the computing service environment. More specifically, the virtual secure region may be the result of the data encryption and the obfuscation of the relationship between the secure region accounts and the public region accounts. The secure data may be visible within the public region, but the secure data may only be accessed through a region translation device.

The region translation device may be configured to transfer secure data between the virtual secure region and the public region. The region translation device may utilize a translation table that maps a secure region account to a public region account to identify a secure region account and encrypt and decrypt secure data associated with the secure region account. In one example, the region translation device and the translation table may be physically separated from other components of the computing service environment located in a data center and access to the region translation device and the translation table may be restricted to authorized government persons (e.g., cleared labor or labor with classified authorizations).

In the past, computing hardware and software used to provide a secure region computing service environment have been implemented using physical security controls to maintain compliance with rules associated with government agencies, contractors, educational institutions, and other entities. For example, physical security rules may stipulate that computing resources used to provide a secure region are to be physically separate from computing resources used to provide an unsecure public region, and that access to the computing resources used for the secure region be limited to cleared labor. Physical security controls associated with maintaining security compliance for a secure region have resulted in fixed costs and operational costs that exceed costs associated with maintaining equivalent public regions.

The current technology allows for the implementation of a virtual secure region on computing resources used to execute both the virtual secure region and a public region. For example, a virtual secure region may be implemented using secure computing resources that may be physically separated from public computing resources and may be accessible only to cleared labor. The secure computing resources may be configured to map secure region accounts and public accounts and encrypt/decrypt secure data transferred between the secure region and the public region. Consequently, secure data can be stored within a virtual secure region that exists within a public region, thereby eliminating a need for a separate data center that houses a secure region and eliminating the associated cost of a separate data center.

FIG. 1 is a diagram illustrating a high level example of a system 100 for a virtual secure region 108 created within a public region 110 of a computing service environment 104. As illustrated, the system 100 may be implemented using computing resources located in a computing service data center 102 that houses computing resources (e.g., computer systems and associated components). The computing resources may be used to execute a computing service environment 104 that provides a public region 110 that may be accessible via a client 122 over a network 120. The computing service environment 104 may employ virtualization that allows a single physical server computer to host multiple computing instances (e.g., virtual guest machines) using a hypervisor and additional virtualization schemes (e.g., virtualized storage, virtualized networking, etc.). Each computing instance may be a guest machine acting as a distinct logical computing system.

The system 100 may include a computing service environment 104 in which a public region 110 and a virtual secure region 108 may be implemented, and a region translation device 116 having access to a translation table 118 that are located within a physically secure area 106 accessible only to authorized personnel. A public region 110 may be a commercially available computing service environment 104 hosted within a geographically situated computing service data center 102. The public region 110 may not be subject to any specific regulatory compliance requirements, such as the United States International Traffic in Arms Regulations (ITAR), for example. A customer can purchase remote computing services, such as one or more computing instances that are executed on behalf of the customer within the public region 110.

A virtual secure region 108 that may be subject to specific government regulatory compliance requirements (e.g., ITAR) may be created within the public region 110 of the computing service environment 104 by encrypting data 114 and hiding a relationship between a public region account and a secure region account that is associated with encrypted data 112. Namely, the virtual secure region 108 may, in one example, store encrypted data 112 associated with a secure region account that may be mapped to a public region account using the translation table 118. The translation table 118 may describe a relationship between the secure region account and the public region account. The account information included in the translation table 118 may be inaccessible to the public region 110, and in some examples may be encrypted. The encrypted data 112 may be visible within the public region 110, but may appear to be unassociated with any particular publically known identity. Those seeking to identify and take encrypted data 112 from the virtual secure region 108 may be hindered due to encryption techniques applied to the encrypted data 112 and the apparent absence of an association between the encrypted data 112 and a public region identity.

In one example, a public region account and a secure region account may be created for a customer. The public region account may be mapped to the secure region account in the translation table 118, resulting in associating encrypted data 112 owned by the secure region account with the public region account. In some examples, a public region account may be mapped to multiple secure region accounts as described later. Additionally, many public region accounts may be mapped to one or more secure region accounts.

The region translation device 116 may be configured to handle requests associated with a public region account to transfer data between the virtual secure region 108 and the public region 110. For example, the region translation device 116 may be used to identify a secure region account that may be mapped to a public region account using the translation table 118 and retrieve encrypted data 112 from the virtual secure region 108, or store encrypted data 112 to the virtual secure region 108 depending on the nature of a request. Also, the region translation device 116 may be configured to encrypt and decrypt the data transferred between the virtual secure region 108 and the public region 110. For example, data 114 that is to be stored to the virtual secure region 108 may be encrypted using an encryption technique and then stored to the virtual secure region 108. Encrypted data 112 retrieved from the virtual secure region 108 may be decrypted using the encryption technique and then returned to the public region 110, where the encrypted data may be passed on to a client for decryption or another government network for decryption or other use.

As an illustration, data 114 that is to be stored to the virtual secure region 108 may be provided to the region translation device 116 with a request to store the data 114. The region translation device 116 may be configured to identify a public region account associated with the request to store the data 114 and query the translation table 118 for a secure region account that maps to the public region account. If a matching secure region account is not found for the public region account, then the request may be dropped. In one case, the data 114 may be encrypted using an encryption technique and stored to a storage location in the virtual secure region 108 (i.e., a virtualized region in the public region 110). The secure region account may then be updated with an identifier (e.g., a file name) that may be used identify the data 114 in the public region 110 and a reference to the storage location of the encrypted data 112 (e.g., a record, memory address, Uniform Resource Locator (URL), etc.), resulting in associating the identifier for the data 114 with the reference to the storage location of the encrypted data 112.

Encrypted data 112 stored to the virtual secure region 108 may be accessible via the public region 110 by requesting the encrypted data 112 via the region translation device 116. The request for the encrypted data 112 may include an identifier for the encrypted data 112. The region translation device 116 may be configured to identify the public region account associated with the request for the encrypted data 112 and to query the translation table 118 for a secure region account that maps to the public region account. Identity and access controls for the public region account may be cascaded down from a secure region account that maps to the public region account, thereby providing the public region account with data permissions and policies that may be queried through the region translation device 116 and the translation table 118.

In obtaining the secure region account that maps to the public region account, the identifier for the encrypted data 112 included in the request may be used to identify a reference in the translation table 118 that maps to the identifier and references a storage location in the virtual secure region 108 where the encrypted data 112 may be stored. For example, the region translation device 116 may be configured to query the translation table 118 for the reference to the storage location where the encrypted data 112 may be obtained.

The region translation device 116 may be configured to obtain the encrypted data 112 from the storage location in the virtual secure region 108 and decrypt the encrypted data 112 using a decryption technique that was used to encrypt the encrypted data 112. Having decrypted the encrypted data 112, which is now data 114, the data 114 may be transferred to the public region 110 for use within the public region 110. For example, computing services (e.g., computing instances, distributed processing, analytics, etc.) configured to execute within the public region 110 may access and utilize the encrypted data 112. In an alternative configuration, the region translation device 116 may appear as a storage device to the computing services. As such, in performing data operations, the computing services may make data related requests to the region translation device 116 and the region translation device 116 may be configured to translate (e.g., identify, locate, and encrypt/decrypt) data (data 114 and encrypted data 112) as the data is transferred between the public region 110 and the virtual secure region 108.

In cases where encrypted data 112 may not need to be decrypted for use in the public region 110, or where encrypted data 112 may be retrieved and transferred to another storage location, the region translation device 116 may be configured to obtain the encrypted data 112 from a storage location in the virtual secure region 108 and provide the encrypted data 112 to a requester without decrypting the encrypted data 112.

Figure 2:
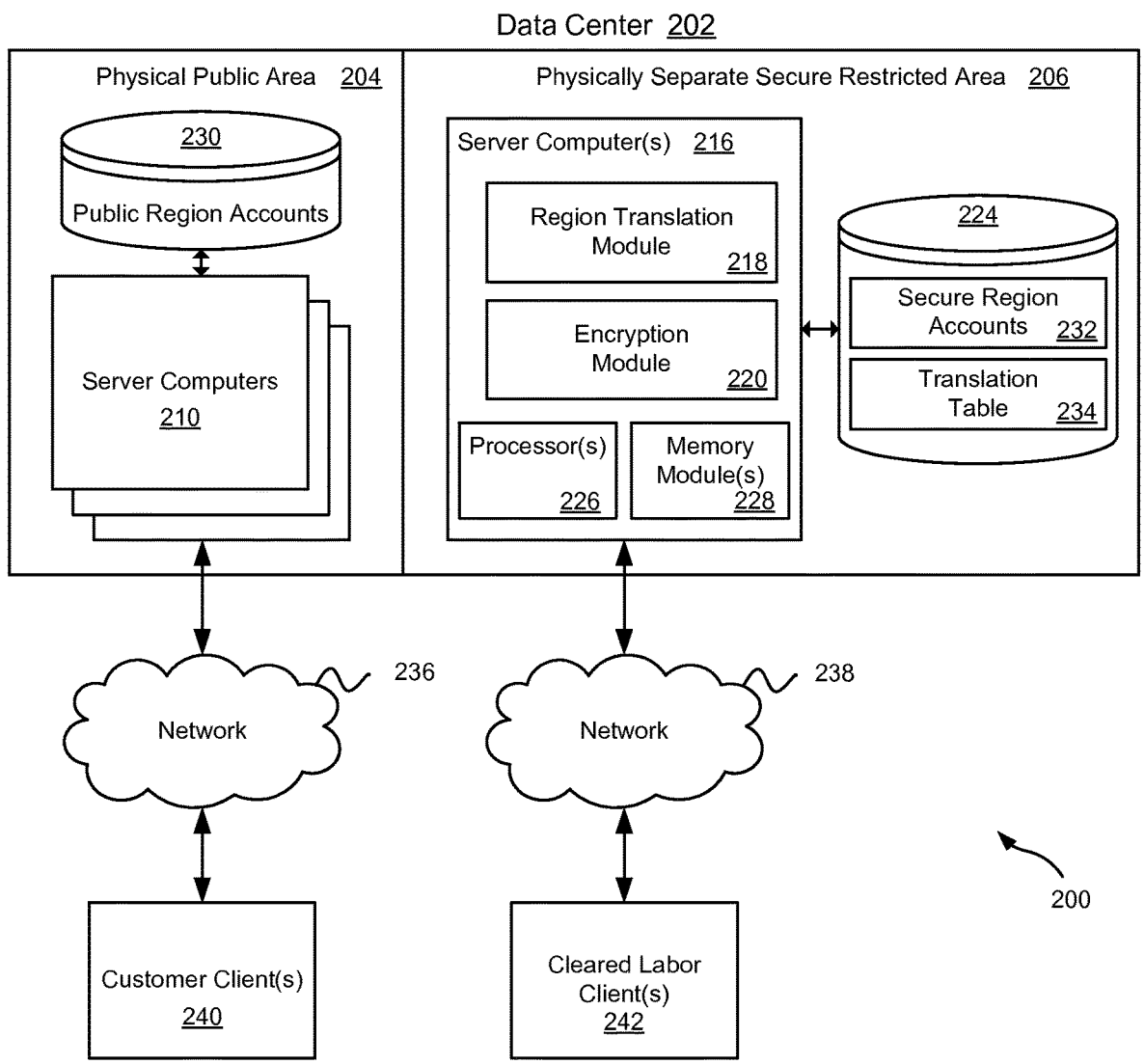
FIG. 2 is a block diagram that illustrates various example components included in a system used to provide a virtual secure region within a public region.

FIG. 2 illustrates components of an example system environment 200 on which the present technology may be executed. The system environment 200 may include a data center 202 that houses physical computer systems and associated components used to provide a computing service environment. The data center 202 may be divided into a physical public area 204 that includes server computers 210 and associated components used to provide a computing service environment, and a physically separate, secure restricted area 206 that includes one or more server computers 216 and components used as part of providing a virtual secure region within the computing service environment.

The server computers 210 providing the computing service environment may be in communication with a number of customer clients 240 via a network 236. Customers may access the computing service environment in order to utilize computing services, such as compute services, storage services, virtual networking services, application services, and the like. A public region of the computing service environment may provide commoditized computing services without any special security restrictions. A virtual secure region that complies with specific regulatory and compliance requirements may be implemented within the public region of the computing service environment.

In one example, the virtual secure region may be implemented using data encryption and obfuscation of secure region accounts to form the virtual secure region within the public region of the computing service environment. More specifically, secure data may be stored alongside unsecure data in the public region of the computing service environment, but the secure data may be encrypted and ownership of the secure data may be obfuscated so that a relationship between a secure region account that owns the secure data and a public region account may not be determined. Alternatively, in some examples, storage contained within the physical public area 204 may be physically and/or logically partitioned so as to provide for a public region and a secure region. For example, designated physical storage devices may be used to store secure data in a secure region within physical public area 204 and other physical storage devices may be designated to store unsecure data in a public region within the physical public area 204.

In one example configuration, a relationship between secure region accounts 232 that correspond to public region accounts 230 may be obfuscated using a translation table 234 to hide the relationship from the public region. For example, a public account identifier (e.g., "public account 123") used to identify a public region account 230 in the public region may be included in the translation table 234 and may be associated with a secure account identifier (e.g., "22eb7d840638304df2f4ca27d5a3af1a") used to identify a secure region account 232 in the secure region. In some examples, a random account identifier may be generated for a secure region account 232 and the random account identifier may be associated with one or more public region accounts 230 in the translation table 234. As a result, a relationship between the public region account 230 and the secure region account 232 may be unidentifiable except through the use of the translation table 234.

In another example, to further obfuscate a relationship between a secure region account 232 and a public region account 230, a one-to-many, many-to-one, and/or a many-to-many account relationship technique may be used. For example, a public region account 230 may be associated with multiple secure region accounts 232, and multiple public region accounts 230 may be associated with multiple secure region accounts 232, thereby further obfuscating a relationship between a public region account 230 and any individual secure region account 232 included in the multiple secure region accounts 232.

The server computer 216 located within the physically separate secure restricted area 206 may be configured to act as a region translation device that transfers data between a public region and a virtual secure region implemented using the server computers 210. In one example, the server computer 216 may include a region translation module 218 and an encryption module 220. The region translation module 218 may be configured to facilitate the transfer of data between a virtual secure region and a public region of a computing service environment. More specifically, the region translation module 218 may be configured to receive data requests from customer clients 240 and/or computing services for data located in a virtual secure region.

In receiving a data request, the region translation module 218 may be configured to identify a public region account 230 associated with the data request. For example, the request may include an account identifier that identifies the public region account 230. A translation table 234 used to maintain relationships between public region accounts 230 and secure region accounts 232 may be accessible to the region translation module 218. The region translation module 218 may be configured to access the translation table 234 to obtain a secure region account 232 that corresponds to the public region account 230 and the secure region account 232 may be used to identify secure data stored in the virtual secure region that corresponds with the data request. Secure data stored in the virtual secure region may be encrypted.

In one example, a secure region account 232 may include references to storage locations for secure data owned by the secure region account 232. The references may be obtained from the secure region account 232 and used to store secure data to a storage location in the virtual secure region or retrieve the secure data from the storage location in the virtual secure region. For example, when a customer accesses the customer's public region account 230 that is associated with a secure region account 232, the customer may be presented with secure data (e.g., a secure data listing, secure data directory, etc.) that is owned by the secure region account 232. The customer may request the secure data and a reference to a storage location included in the secure region account may be used to retrieve the secure data.

In another example, the translation table 234 may be used to maintain relationships between data identifiers (e.g., file names, tags, etc.) for secure data and a reference to secure data stored in a virtual secure region. More specifically, secure data represented in a public region may be represented using a data identifier (e.g., "document.txt") and the data identifier may be included in the translation table 234 and associated with a reference (e.g., a URL) to a storage location in a virtual secure region. A customer may request the secure data using the data identifier and the reference to the storage location (not shown in FIG. 2) may be obtained from the translation table 234.

After receiving secure data to be stored to the virtual secure region, or retrieving secure data from the virtual secure region, the region translation module 218 may be configured to provide the secure data to the encryption module 220, which may be configured to encrypt or decrypt the secure data based on the nature of a request. Namely, the encryption module 220 may be configured to encrypt secure data that is to be stored to the virtual secure region, and decrypt secure data that is to be returned to the public region. Secure data may be encrypted using an encryption technique that may include, for example, private key encryption, public key encryption, hashing encryption, symmetric encryption or asymmetric encryption. In one example, an encryption technique used to encrypt the secure data may be specified in a secure region account 232. For example, a customer may specify that a particular encryption technique may be used to encrypt the customer's secure data. In another example, a common encryption technique (e.g., RSA encryption) may be used to encrypt the secure data stored in a virtual secure region.

After encrypting or decrypting the secure data using the encryption module 220, a data request may be fulfilled by storing the encrypted secure data to a storage location in the virtual secure region, or by returning the decrypted secure data to the public region. When storing encrypted secure data to a storage location in the virtual secure region, a reference to the storage location may be updated in the secure region account 232, such that the secure data may be located and retrieved in response to a request for the secure data.

In one example, a data sharding technique may be used to distribute secure data among various storage partitions and/or storage locations. For example, secure data associated with a secure region account 232 may be divided among multiple storage locations within the secure region and references to the storage locations may be included in the secure region account 232. Thus, retrieving the secure data from the multiple storage locations may be accomplished by obtaining the references from the secure region account 232 and retrieving the secure data from the multiple storage locations.

As indicated earlier, the server computer 216 acting as a region translation device may be located in the physically separate secure restricted area 206 of the data center 202. Access to the server computer 216 and any related components (e.g., a data store 224 used to store the secure region accounts 232 and the translation table 234) may be limited to authorized personnel. For example, under some government regulations, access to the physically separate secure restricted area 206 may be restricted to authorized government citizens (e.g., cleared labor). These restrictions may apply to both physical access to the physically separate secure restricted area 206 and virtual access or remote access to the server computer 216 and related components. Therefore, a secure maintenance network channel may be used to allow a cleared labor client 242 access to the server computer 216 via a network 238. The secure maintenance network channel may be used to set-up, and maintain the server computer 216, region translation module 218, encryption module 220, secure region accounts 232, translation table 234, and other components used to provide the virtual secure region. In one example, the maintenance network channel may be configured with a hardware communication line (e.g., a hardware VPN (virtual private network)) to the server computer 216 and/or related components. In another example, the maintenance network channel may be configured with a virtual private network endpoint that may be secure and accessible to only cleared labor using a cleared labor client 242. For example, access to the server computer 216 via the maintenance network channel may be controlled using multi-factor authentication (e.g., a token, digital certificate, smart card, biometric, etc.).

As illustrated, a customer may utilize a customer client 240 to access the server computers 210 used to provide the customer with a computing service environment, and a cleared labor client 242 may be used by authorized personnel (cleared labor) to access the server computer 216 and related components. A client 240/242 may comprise, for example, a processor-based system such as a computing device. A client device may be a device such as, but not limited to, a desktop computer, laptop or notebook computer, tablet computer, mainframe computer system, handheld computer, workstation, network computer, or other devices with like capability. A client 240/242, in another example, may be a software client configured with credentials to access the server computers 210 or the server computers 216 respectively.

The various processes and/or other functionality contained within the system environment 200 may be executed on one or more processors 226 that are in communication with one or more memory modules 228. The system environment 200 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 236 and 238 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
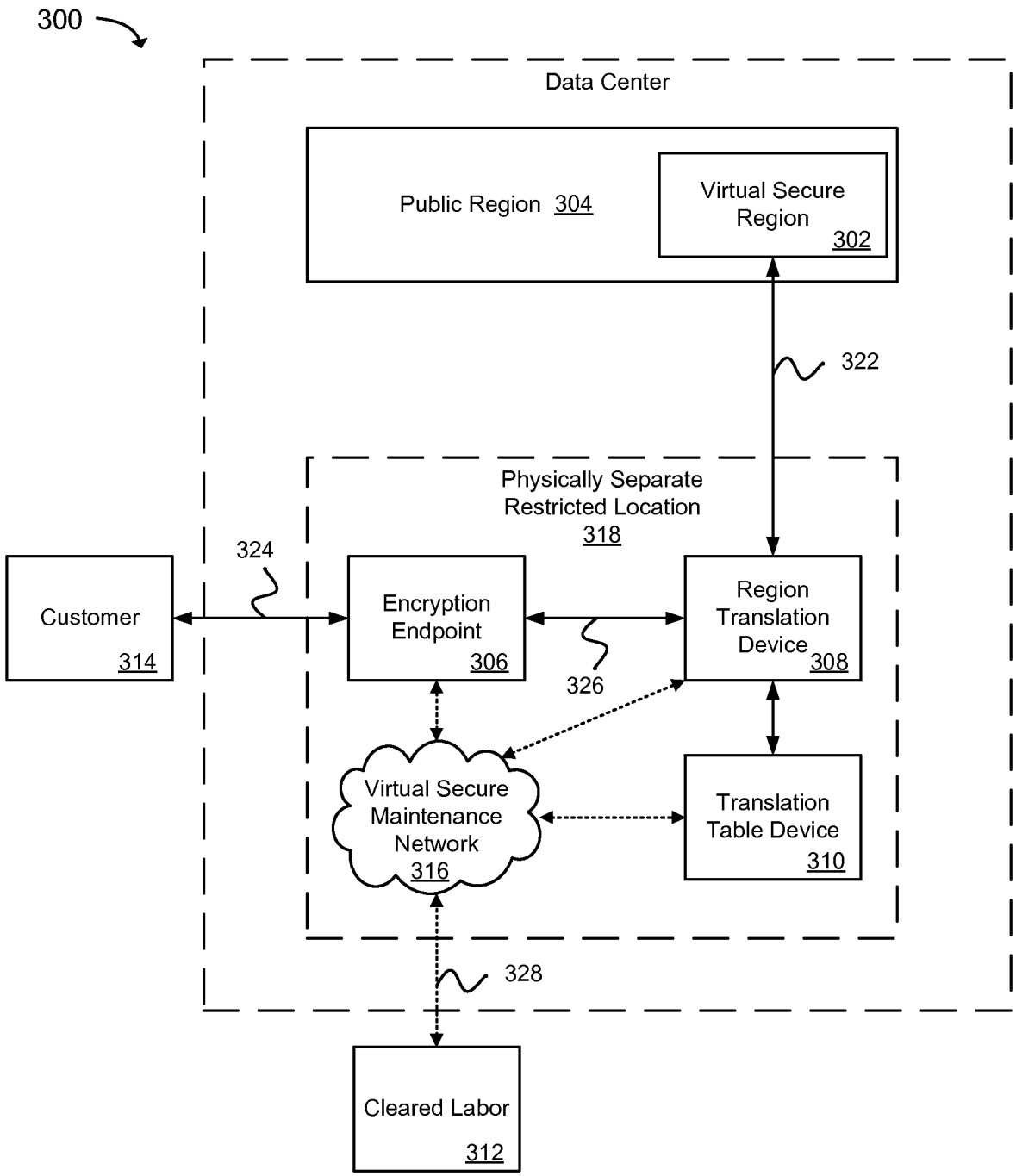
FIG. 3 is a block diagram illustrating an example system configuration used to provide a virtual secure region.

FIG. 3 is a block diagram that illustrates an example system 300 used to provide a virtual secure region 302. The system 300 may include devices and endpoints that may be located in a physically separate, restricted location 318 accessible only to cleared labor 312. As illustrated, the physically separate restricted location 318 may contain an encryption endpoint 306, a region translation device 308, and a translation table device 310.

The encryption endpoint 306 may be a hardware gateway or a virtualized gateway to the virtual secure region 302. The encryption endpoint 306 may have a public endpoint that may be accessible via an encrypted customer channel 324 used by a customer 314, and a secure endpoint accessible via a region translation device channel 326 used for communications between the encryption endpoint 306 and the region translation device 308.

Also, the encryption endpoint 306 may have an endpoint that may be accessible via a virtual secure maintenance network channel 328 used to access a virtual secure maintenance network 316. The virtual secure maintenance network 316 may be configured to allow cleared labor 312 to access the different components contained in the physically separate restricted location 318 (e.g., the encryption endpoint 306, the region translation device 308, and the translation table device 310) and modify a configuration of the components via the virtual secure maintenance network channel 328. Non-limiting examples of configuration settings that may be configured via the secure maintenance network 316 may include settings for public region accounts, secure region accounts, mappings for public region accounts to secure region accounts, and secure region policies.

The region translation device 308 may be a hardware device or a virtualized device configured to perform translation (e.g., encryption of data to provide the virtual secure region 302 within a public region 304) of accounts and data between the public region 304 and the virtual secure region 302. Namely, the region translation device 308 may be configured to identify secure region accounts that correspond to public region accounts and encrypt and decrypt data that may be transferred between the virtual secure region 302 and the public region 304. In one example, the region translation device 308 may include a hardware security module (HSM) that has controls that provide tamper evidence, such as logging and alerting, and tamper resistance, such as deleting data upon tamper detection. The HSM may contain one or more secure cryptoprocessor chips that may be used deter tampering and bus probing of the region translation device 308.

The region translation device 308 may be in communication with the encryption endpoint 306 via the region translation device channel 326, and may be in communication with the virtual secure region 302 (by way of the public region 304) via a public region channel 322. For example, the region translation device 308 may have an endpoint used to communicate with the encryption endpoint 306 to receive data from a customer 324, and to send data to the customer 324 through the encryption endpoint 306. The region translation device 308 may have another endpoint to communicate with the public region 304, where the region translation device 308 appears to the public region 304 as a public region device (e.g., a storage device). The region translation device 308 may encrypt customer data received via the encryption endpoint 306 and save the data to the virtual secure region 302 within the public region 304. Further, the region translation device 308 may decrypt data retrieved from the virtual secure region 302 within the public region 304 and send the data to the customer 324 through the encryption endpoint 306.

The translation table device 310 may be a hardware device or a virtualized device configured to maintain relationships between public region accounts and secure region accounts. In addition, the translation table device 310 may store encryption keys for the different components used to provide the virtual secure region 302, where the encryption keys may be accessible through the translation table device 310.

The communication channels described in association with FIG. 3 may be logical paths for data to move from endpoint to endpoint. In some examples, the communication channels may be encrypted. An endpoint may be a logical point of entry or egress for data transmitted between the different components illustrated and an endpoint may be represented by one or more logical addresses, such as an Internet Protocol (IP) address, an Ethernet address, or a proprietary hardware or software channel.

Illustratively, a virtual secure region 302 may be created using cleared labor 312 to install the encryption endpoint 306, the region translation device 308, and the translation table device 310 in a physically separate restricted location 318 accessible only to cleared labor 312 within a data center. Cleared labor 312 may then be used to activate the virtual secure maintenance network 316 and the associated virtual secure maintenance network channel 328 for maintenance that may be performed locally or remotely. The virtual secure maintenance network 316 may then be used for maintenance tasks that do not require physical access to the physically separate restricted location 318 (e.g., hardware failures and software failures that cannot be handled remotely).

The virtual secure maintenance network 316 may be used to configure the translation table device 310 with configuration information that may include information for public region accounts, public region account mappings, secure region accounts, a virtual secure region name, virtual secure region policies, mapped computing services, service access policies, service limit policies, configuration attributes attributable to a public region 304 and/or a virtual secure region 302, as well as other information. The cleared labor may then enable restricted public network access to the virtual secure maintenance network 316 in order to begin testing of the virtual secure region 302.

Upon verification that the virtual secure region 302 is ready to be placed in production, cleared labor 312 may use the virtual secure maintenance network 316 to enable public network access to the virtual secure region 302. Customers may connect to the encryption endpoint 306 as if the encryption endpoint 306 were a regular region endpoint, with the exception of specific encryption requirements. A customer may view the virtual secure region 302, but virtual secure region activity may be translated to the public region 304 via the region translation device 308. More specifically, the virtual secure region activity (e.g., identification and encryption/decryption of secure data) may be handled by the region translation device 308 resulting in the virtual secure region activity being hidden from the public region 304. Security may be maintained using encryption of secure data transferred between the virtual secure region 302 and the public region 304.

Figure 4:
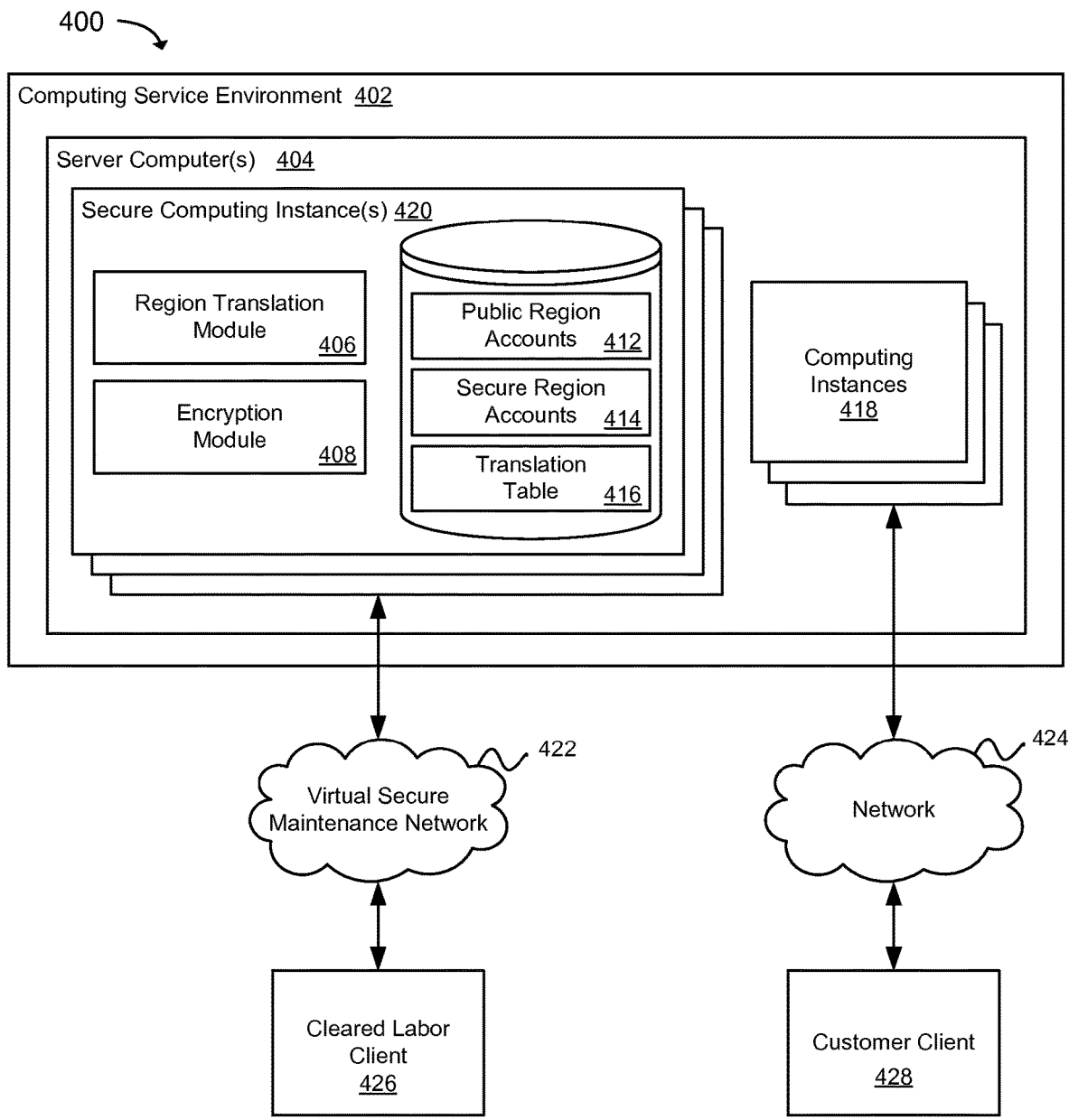
FIG. 4 is a block diagram illustrating an example system for a virtual secure region implemented using secure computing instances.

FIG. 4 is a block diagram that illustrates an alternative example system 400 that may be used to provide a virtual secure region. The system 400 may include a computing service environment 402 having a number of server computers 404 that host computing instances 418. The computing instances 418 may be configured to provide a public region, within which, a virtual secure region may be created using encryption. The public region and the virtual secure region may be accessible to customers via customer clients 428 that may be in communication with the computing service environment 402 over a network 424. One or more secure computing instances 420 included within the computing service environment 402 may be configured to function as a region translation device. For example, the secure computing instances 420 may include a region translation module 406, an encryption module 408, and may host data for public region accounts 412, secure region accounts 414, and a translation table 416 configured as described in association with FIG. 2.

The secure computing instances 420 may be configured to retrieve secure data from the virtual secure region within the computing service environment 402 and transfer the secure data to the public region within the computing service environment 402. Access to the secure computing instances 420 may be limited to cleared labor via cleared labor clients 426, using a virtual secure maintenance network 422 and channel and multi-factor authentication. Setup and maintenance associated with the secure computing instances 420 may be performed by cleared labor using the virtual secure maintenance network 422 and channel. All other access to the secure computing instances 420 may be restricted and methods may be implemented for detecting unauthorized access and programmatically reacting to unauthorized access. For example, in the event that a secure computing instance 420 is tampered with, data stored in the memory of a server computer 404 that hosts the secure computing instance 420 may be deleted.

Figure 5:
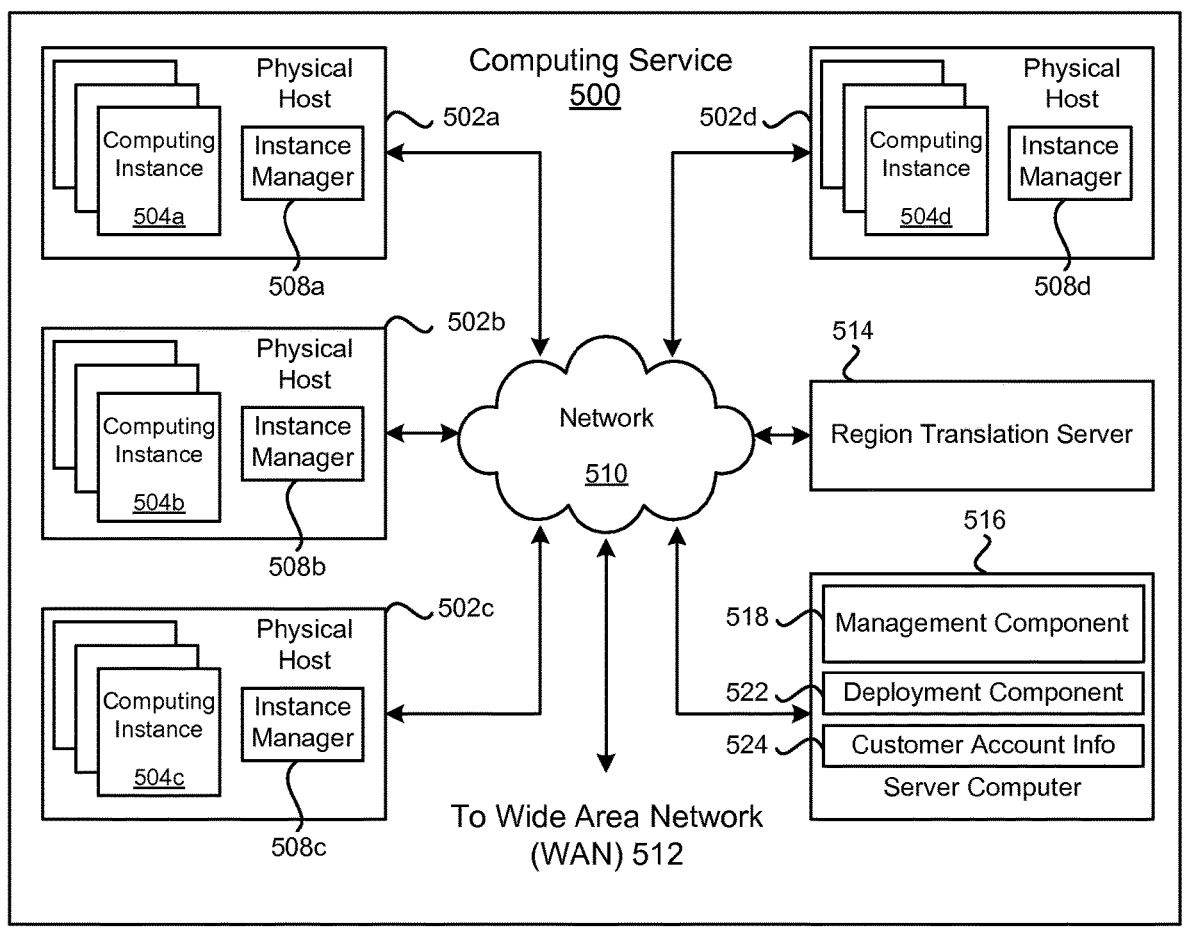
FIG. 5 is a block diagram that illustrates an example computing service environment that includes a region translation server.

FIG. 5 is a block diagram illustrating an example computing service 500 that may be used to execute and manage a number of computing instances 504a-d. In particular, the computing service 500 depicted illustrates one environment in which the technology described herein may be used. The computing service 500 may be one type of environment that includes various virtualized service resources that may be used, for instance, to host computing instances 504a-d.

The computing service 500 may be capable of delivery of computing, storage and networking capacity as a software service to a community of end recipients. In one example, the computing service 500 may be established for an organization by or on behalf of the organization. That is, the computing service 500 may offer a "private cloud environment." In another example, the computing service 500 may support a multi-tenant environment, wherein a plurality of customers may operate independently (i.e., a public cloud environment). Generally speaking, the computing service 500 may provide the following models: Infrastructure as a Service ("IaaS"), Platform as a Service ("PaaS"), and/or Software as a Service ("SaaS"). Other models may be provided. For the IaaS model, the computing service 500 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 500. End customers may access the computing service 500 using networked client devices, such as desktop computers, laptops, tablets, smartphones, etc. running web browsers or other lightweight client applications, for example. Those familiar with the art will recognize that the computing service 500 may be described as a "cloud" environment.

The particularly illustrated computing service 500 may include a plurality of server computers 502a-d. While four server computers are shown, any number may be used, and large data centers may include thousands of server computers. The computing service 500 may provide computing resources for executing computing instances 504a-d. Computing instances 504a-d may, for example, be virtual machines. A virtual machine may be an instance of a software implementation of a machine (i.e. a computer) that executes applications like a physical machine. In the example of a virtual machine, each of the server computers 502a-d may be configured to execute an instance manager 508a-d capable of executing the instances. The instance manager 508a-d may be a hypervisor, virtual machine monitor (VMM), or another type of program configured to enable the execution of multiple computing instances 504a-d on a single server. Additionally, each of the computing instances 504a-d may be configured to execute one or more applications.

One or more server computers 514 and 516 may be reserved to execute software components for managing the operation of the computing service 500 and the computing instances 504a-d. For example, a server computer 514 may execute a region translation server configured to transfer data between a virtual secure region and a public secure region as described earlier.

A server computer 516 may execute a management component 518. A customer may access the management component 518 to configure various aspects of the operation of the computing instances 504a-d purchased by a customer. For example, the customer may setup computing instances 504a-d and make changes to the configuration of the computing instances 504a-d.

A deployment component 522 may be used to assist customers in the deployment of computing instances 504a-d. The deployment component 522 may have access to account information associated with the computing instances 504a-d, such as the name of an owner of the account, credit card information, country of the owner, etc. The deployment component 522 may receive a configuration from a customer that includes data describing how computing instances 504a-d may be configured. For example, the configuration may include an operating system, provide one or more applications to be installed in computing instances 504a-d, provide scripts and/or other types of code to be executed for configuring computing instances 504a-d, provide cache logic specifying how an application cache should be prepared, and other types of information. The deployment component 522 may utilize the customer-provided configuration and cache logic to configure, prime, and launch computing instances 504a-d. The configuration, cache logic, and other information may be specified by a customer accessing the management component 518 or by providing this information directly to the deployment component 522.

Customer account information 524 may include any desired information associated with a customer of the multi-tenant environment. For example, the customer account information may include a unique identifier for a customer, a customer address, billing information, licensing information, customization parameters for launching instances, scheduling information, etc. As described above, the customer account information 524 may also include security information used in encryption of asynchronous responses to API requests. By "asynchronous" it is meant that the API response may be made at any time after the initial request and with a different network connection.

A network 510 may be utilized to interconnect the computing service 500 and the server computers 502a-d, 516. The network 510 may be a local area network (LAN) and may be connected to a Wide Area Network (WAN) 512 or the Internet, so that end customers may access the computing service 500. The network topology illustrated in FIG. 5 has been simplified, many more networks and networking devices may be utilized to interconnect the various computing systems disclosed herein.

Figure 6:
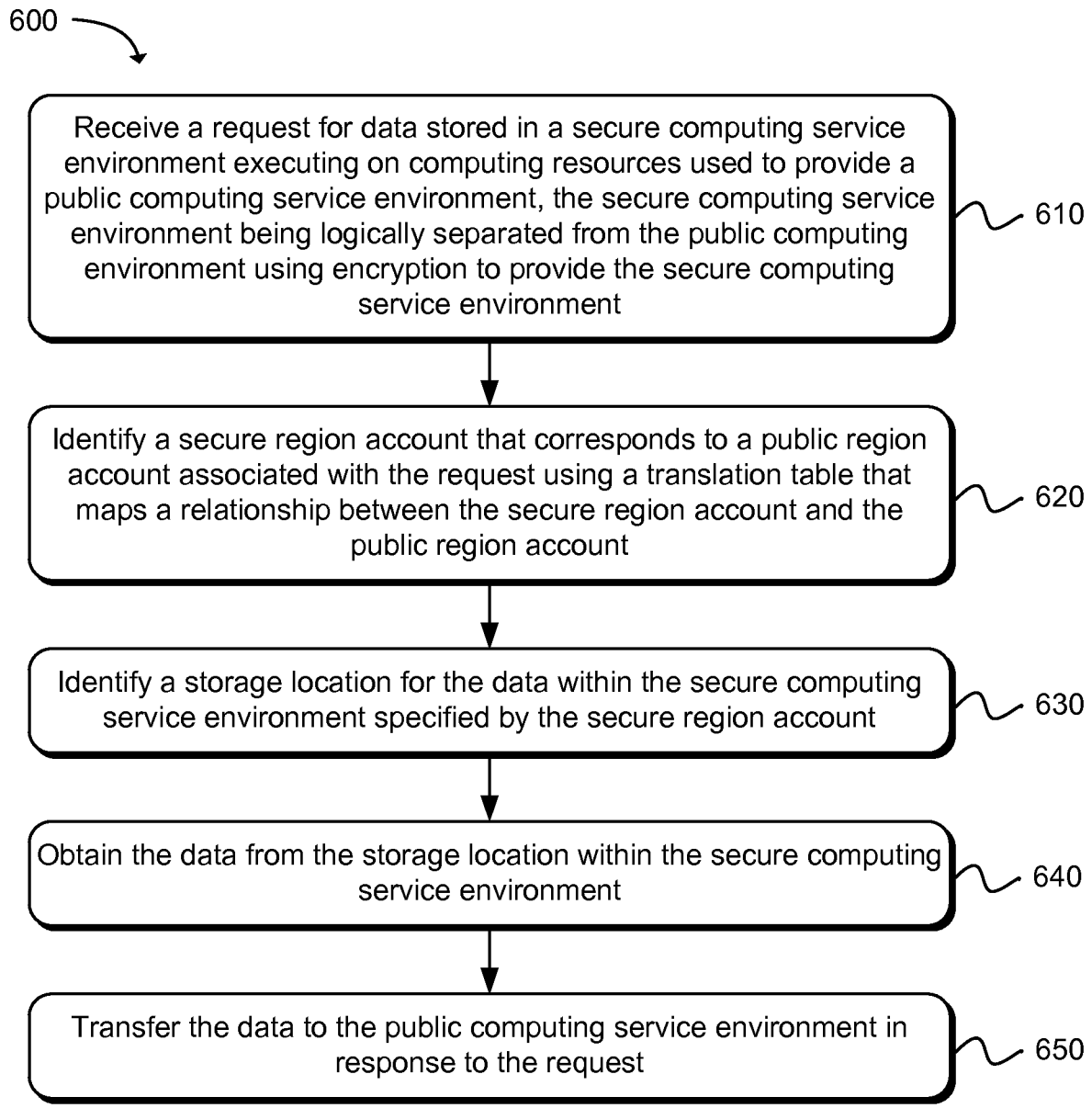
FIG. 6 is a flow diagram illustrating an example method for transferring data between a secure computing service environment and a public computing service environment.

FIG. 6 is a flow diagram illustrating an example method 600 for transferring data between a secure computing service environment and a public computing service environment. Starting in block 610, a request may be received for data stored in a secure computing service environment executing on computing resources used to provide a public computing service environment. The secure computing service environment may be logically separated from the public computing environment using encryption that may be used to provide the secure computing service environment. In one example, a request for data may be received at a region translation device, which may be physically separated from computing resources used to execute a public computing service environment and a secure computing service environment.

As in block 620, a secure region account that corresponds to a public region account associated with the request may be identified using a translation table that maps a relationship between the secure region account and the public region account, where the translation table may be physically located separate from computing resources used to execute the secure computing service environment and the public computing service environment.

As in block 630, a storage location for the data may be identified within the secure computing service environment specified by the secure region account. Having identified the storage location, as in block 640, the data may be obtained from the storage location within the secure computing service environment. In one example, a region translation device may be configured to retrieve data via a secure endpoint used to communicate with a secure computing service environment and transfer the data to a public computing service environment via a public endpoint configured to communicate with the public computing service environment.

Data obtained from the secure computing service environment may be decrypted prior to transferring the data to the public computing service environment via the public endpoint. Also, data being transferred to the secure computing service environment may be encrypted prior to transferring the data to the secure computing service environment via the secure endpoint. As in block 650, the data may be transferred to the public computing service environment in response to the request.

Figure 7:
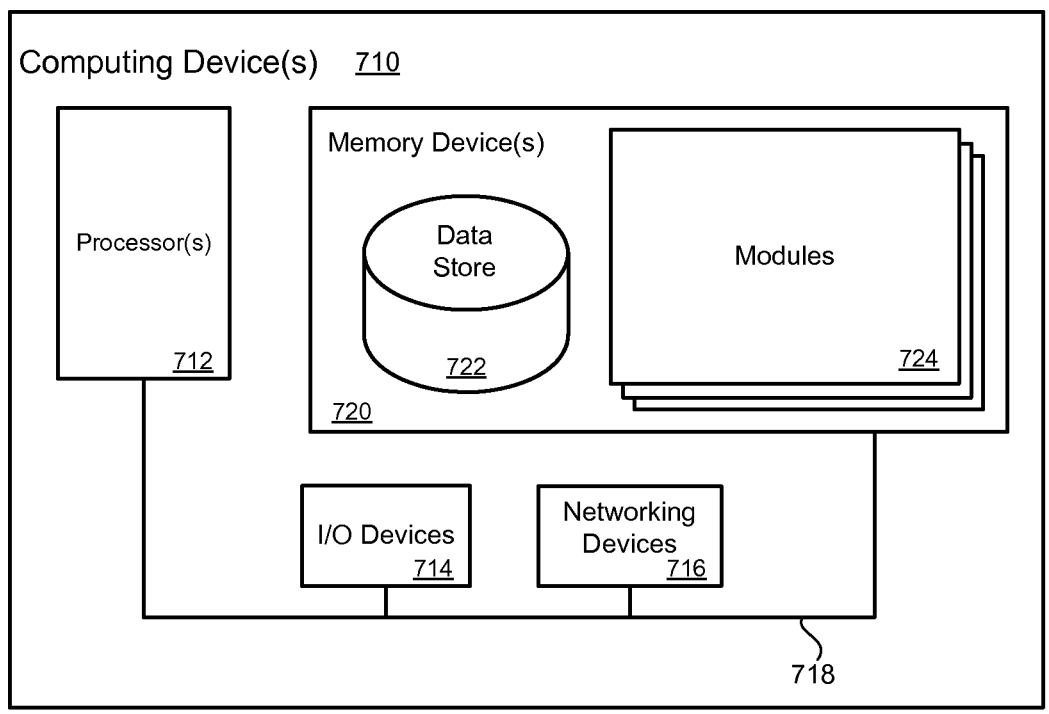
FIG. 7 is block diagram illustrating an example of a computing device that may be used to execute a method for transferring data between a virtual secure region and a public region.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 724 that are executable by the processor(s) 712 and data for the modules 724. The memory device 720 may contain a translation module, an encryption module, and other modules. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory device 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium including
   instructions embodied thereon, the instructions when executed by a processor:
   create a virtual secure maintenance network in a physically secure area of a data center, which allows cleared labor to access a region translation device located in the physically secure area of the data center, wherein physical access to the physically secure area of the data center is limited to the cleared labor, and the data center includes a physical public area with computing resources used to execute both a public region and a secure region, and a virtual secure maintenance network channel allows the cleared labor to connect to the virtual secure maintenance network and access the region translation device to manage the secure region of the data center;
   create and configure the secure region of the data center using the virtual secure maintenance network channel, wherein encryption is used to logically separate the secure region from the public region of the data center, wherein ownership of data is determined using the region translation device that has access to a translation table which maps a public region account to a secure region account that owns the data in the secure region, and the translation table specifies a storage location for the data in the secure region of the data center, and the translation table is located with the region translation device in the physically secure area in the data center;
   receive a customer request associated with the public region account at the data center requesting the data stored in the secure region of the data center;
   identify the secure region account mapped to the public region account using the region translation device to access the translation table;
   identify the data stored in the secure region of the data center using the region translation device to access the translation table, wherein the data is encrypted using an encryption technique specified by the secure region account when stored to the secure region;
   obtain, using the region translation device, the data from the secure region;

decrypt, using the region translation device, the data using a decryption technique specified by the secure region account; and transfer the data, using the region translation device, to the public region of the data center for customer-use in the public region in association with the public region account.

2. A non-transitory machine readable storage medium as in claim 1, wherein the instructions that when executed by the processor further receive a cleared labor request to access the region translation device and modify a configuration of the region translation device via the virtual secure maintenance network channel with a hardware communication line to the region translation device.

3. A non-transitory machine readable storage medium as in claim 1, wherein the instructions that when executed by the processor further:

identify a storage location in the secure region specified in account information for the secure region account; and
access the data in the storage location.

4. A computer implemented method, comprising:

creating a virtual secure maintenance network in a physically secure area of a data center which allows cleared labor to access a region translation device located in the physically secure area of the data center, wherein physical access to the physically secure area of the data center is limited to the cleared labor, and the data center includes a physical public area with computing resources used to execute both a public region and a secure region, and a virtual secure maintenance network channel allows the cleared labor to connect to the virtual secure maintenance network and access the region translation device to manage the secure region of the data center, and a translation table is located with the region translation device in the physically secure area in the data center;

creating and configuring the secure region of the data center using the virtual secure maintenance network channel, wherein encryption is used to logically separate the secure region from the public region of the data center, wherein ownership of data is determined using the region translation device with access to the translation table which maps a public region account to a secure region account that owns the data in the secure region, and the translation table specifies a storage location for the data in the secure region of the data center;

receiving a customer request associated with the public region account at the data center requesting the data stored in the secure region of the data center;

identifying the secure region account using the region translation device to access the translation table which maps the public region account to the secure region account;

identifying a storage location for the data within the secure region of the data center owned by the secure region account using the region translation device to access the translation table which specifies the storage location for the data in the secure region of the data center, wherein the data is encrypted using an encryption technique specified by the secure region account when stored to the secure region;

obtaining, using the region translation device, the data from the storage location within the secure region of the data center;

decrypting the data using the region translation device and a decryption technique specified by the secure region account; and transferring the data, using the region translation device, to the public region in the data center for customer-use in the public region in association with the public region account.

5. A method as in claim 4, further comprising:

receiving the data to be stored in the secure region of the data center at a public endpoint;
encrypting the data; and
transmitting the data that is encrypted to the storage location via a secure endpoint within the secure region of the data center.

6. A method as in claim 4, wherein obtaining the data from the storage location within the secure region of the data center further comprises:

retrieving the data from the secure region of the data center via a secure endpoint; and
transferring the data to the public region of the data center via a public endpoint.

7. A method as in claim 4, wherein transferring the data to the public region of the data center further comprises providing the data to a service that executes within the public region of the data center.

8. A method as in claim 4, further comprising generating a random account identifier for the secure region account that is visible within the public region of the data center resulting in obfuscating a relationship between the public region account and the secure region account.

9. A method as in claim 4, further comprising associating the public region account with multiple secure region accounts, thereby obfuscating a relationship between the public region account and any individual secure region account included in the multiple secure region accounts.

10. A method as in claim 4, further comprising associating multiple public region accounts with the secure region account, thereby obfuscating a relationship between the secure region account and any individual public region account included in the multiple public region accounts.

11. A method as in claim 4, wherein the region translation device uses a public endpoint to communicate with the public region of the data center, and the region translation device uses a secure endpoint to retrieve the data from the secure region of the data center.

12. A method as in claim 11, wherein the region translation device is a virtualized region translation device executing on physically separated computing resources that are accessible to the cleared labor authorized to configure the region translation device.

13. A method as in claim 4, wherein receiving the customer request for the data further comprises receiving the customer request at a computing instance located within the public region of the data center that is configured to retrieve the data from the secure region of the data center and transfer the data to the public region of the data center, wherein access to the computing instance is limited to authorized users.

14. A method as in claim 13, further comprising deleting the data stored in memory for the computing instance as a result of the computing instance being accessed by an unauthorized user.

15. A method as in claim 4, further comprising receiving configuration instructions associated with the region translation device via the virtual secure maintenance network channel accessible to the cleared labor authorized to configure the region translation device.

16. A method as in claim 4, wherein receiving the customer request for the data further comprises receiving the customer request via a communication channel that is an encrypted connection used to communicate with a public endpoint or a secure endpoint.

17. A system, comprising:
at least one processor;
a memory device including instructions that, when executed by the at least one processor, cause the system to:
create a virtual secure maintenance network in a physically secure area of a data center which allows cleared labor to access to a region translation device located in the physically secure area of the data center, wherein physical access to the physically secure area of the data center is limited to the cleared labor, and the data center includes a physical public area with computing resources used to execute both a public region and a secure region, and a virtual secure maintenance network channel allows the cleared labor to connect to the virtual secure maintenance network and access the region translation device to manage the secure region of the data center;
create and configure the secure region of the data center using the virtual secure maintenance network channel, wherein encryption is used to logically separate the secure region from the public region of the data center and to secure data stored in the secure region, wherein ownership of the data is determined using the region translation device that has access to a translation table which maps a public region account to a secure region account that owns the data in the secure region, and the translation table specifies a storage location for the data in the secure region of the data center, and the translation table is located with the region translation device in the physically secure area of the data center;
build the translation table for access by the region translation device, wherein the translation table maps the secure region account for the secure region to the public region account for the public region;
identify the secure region account associated with the data stored in the secure region, the secure region account including specifications for encryption of the data, wherein the secure region account provides access to the secure region of the data center;
identify the public region account for use in the public region, wherein the public region account provides access to the public region of the data center;
associate the secure region account with the public account in the translation table;
receive a customer request associated with the public region account at the data center requesting the data stored in the secure region;
identify the secure region account mapped to the public region account using the region translation device to access the translation table;
identify the data stored in the secure region using the region translation device by accessing the translation table, wherein the data is encrypted when stored to the secure region using an encryption technique specified by the secure region account;
obtain, using the region translation device, the data from the secure region;
decrypt the data using the region translation device and a decryption technique specified by the secure region account; and
transfer the data, using the region translation device, to the public region of the data center for customer-use in the public region in association with the public region account.

18. A system as in claim 17, wherein the memory device includes instructions that, when executed by the processor, causes the system to configure the region translation device using configuration settings received via the virtual secure maintenance network channel, the configuration settings including public region accounts, secure region accounts, mappings between the public region accounts and the secure region accounts, and secure region policies.

19. A system as in claim 17, wherein accessing the region translation device using the virtual secure maintenance network channel is controlled using multi-factor authentication.

20. A system as in claim 17, wherein the memory device includes instructions that, when executed by the processor, causes the system to:
divide the data among multiple storage locations within the secure region; and
retrieve the data from the multiple storage locations as a result of a request to transfer the data to the public region.

* * * * *